US009857496B2

(12) United States Patent
Albrecht

(10) Patent No.: US 9,857,496 B2
(45) Date of Patent: Jan. 2, 2018

(54) POSITIONING DEVICE

(71) Applicant: Robert Bosch GmbH, Stuttgart (DE)

(72) Inventor: Andrej Albrecht, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/028,136

(22) PCT Filed: Sep. 4, 2014

(86) PCT No.: PCT/EP2014/068832
§ 371 (c)(1),
(2) Date: Apr. 8, 2016

(87) PCT Pub. No.: WO2015/058893
PCT Pub. Date: Apr. 30, 2015

(65) Prior Publication Data
US 2016/0252642 A1    Sep. 1, 2016

(30) Foreign Application Priority Data
Oct. 23, 2013   (DE) .................. 10 2013 221 495

(51) Int. Cl.
*G01V 3/165*    (2006.01)
(52) U.S. Cl.
CPC .................. *G01V 3/165* (2013.01)
(58) Field of Classification Search
CPC .......... G01V 3/165; G01V 3/101; G01V 3/08; G01R 27/2605; G01N 27/4148
(Continued)

(56) References Cited

U.S. PATENT DOCUMENTS 5,001,430 A *   3/1991  Peterman .............. G01V 3/105
                                                         324/326
5,670,882 A     9/1997  Brandolino et al.
(Continued)

FOREIGN PATENT DOCUMENTS

CN    1389744 A    1/2003
CN    1912639 A    2/2007
(Continued)

OTHER PUBLICATIONS

International Search Report corresponding to PCT Application No. PCT/EP2014/068832, dated Jan. 9, 2015 (German and English language document) (5 pages).

*Primary Examiner* — Melissa Koval
*Assistant Examiner* — Trung Nguyen
(74) *Attorney, Agent, or Firm* — Maginot, Moore & Beck LLP

(57) ABSTRACT

A locating device includes an AC voltage locating apparatus. The AC voltage locating apparatus has a first receiving apparatus configured to receive a first coupling signal from a locatable object. The AC voltage locating apparatus also has at least a second receiving apparatus configured to receive at least a second coupling signal from the locatable object. The AC voltage locating apparatus also has at least a first amplifier circuit configured to amplify a difference of the first coupling signal relative to a reference signal in at least one operating. The AC voltage locating apparatus also has at least a second amplifier circuit configured to amplify a difference of the first coupling signal and the second coupling signal in at least one operating state.

10 Claims, 3 Drawing Sheets

(58) Field of Classification Search
USPC .... 324/66–67, 76.11, 500, 528, 326, 754.28, 324/600, 632, 687, 126
See application file for complete search history.

(56) References Cited

U.S. PATENT DOCUMENTS

| | | |
|---|---|---|
| 5,773,971 A | 6/1998 | Tavernetti |
| 6,407,550 B1 * | 6/2002 | Parakulam ............... G01V 3/15 324/326 |

FOREIGN PATENT DOCUMENTS

| | | |
|---|---|---|
| CN | 101136661 A | 3/2008 |
| CN | 101490564 A | 7/2009 |
| CN | 101881791 A | 11/2010 |
| CN | 102859393 A | 1/2013 |
| GB | 2 401 951 A | 11/2004 |

\* cited by examiner

POSITIONING DEVICE

This application is a 35 U.S.C. §371 National Stage Application of PCT/EP2014/068832, filed on Sep. 4, 2014, which claims the benefit of priority to Serial No. DE 10 2013 221 495.2, filed on Oct. 23, 2013 in Germany, the disclosures of which are incorporated herein by reference in their entirety.

BACKGROUND

A locating device including an AC voltage locating apparatus, which includes a first receiving means which is provided to receive a first coupling signal from a locatable object, includes at least a second receiving means which is provided to receive at least a second coupling signal from the locatable object, and includes at least a first amplifier circuit which amplifies a difference of the first coupling signal relative to a reference signal in at least one operating state, has already been provided.

SUMMARY

The present disclosure is directed to a locating device including an AC voltage locating apparatus, which includes a first receiving means which is provided to receive a first coupling signal from a locatable object, includes at least a second receiving means which is provided to receive at least a second coupling signal from the locatable object, and includes at least a first amplifier circuit which amplifies a difference of the first coupling signal relative to a reference signal in at least one operating state.

It is provided that the AC voltage locating apparatus includes at least a second amplifier circuit which amplifies a difference of the first coupling signal and the second coupling signal in at least one operating state. An "AC voltage locating apparatus" is intended to mean in particular a device which is provided for an ascertainment of a piece of position information about a locatable object concealed in a workpiece, to which an AC voltage is applied. Preferably, the AC voltage locating apparatus is at least suitable for locating a power line situated in a wall, to which a grid voltage, preferably between 100 volts and 240 volts, advantageously having a frequency of 50 Hz, is applied. In particular, a "receiving means" is intended to mean a means which is provided to receive power inductively and/or capacitively from the locatable object. Preferably, the receiving means is designed as an antenna which appears expedient to those skilled in the art, but particularly preferably as an electrically conductive area. Preferably, the AC voltage locating apparatus includes exactly two receiving means. Alternatively, the AC voltage locating apparatus could include at least three or in particular at least four receiving means. Preferably, the locating device includes additional transmitting means and/or receiving means appearing expedient to those skilled in the art for the inductive, capacitive, and/or high-frequency locating of voltage-carrying and/or voltage-free locatable objects. "Provided" is intended to mean in particular specially programmed, designed, electrically conductively connected, and/or equipped. "An object is provided for a specific function" is intended to mean in particular that the object fulfills and/or carries out this specific function in at least one application and/or operating state. A "coupling signal" is intended to mean in particular a signal which is transmitted to the locating device via an inductive and/or advantageously capacitive coupling of the concealed locatable object via the workpiece. A "locatable object" is intended to mean in particular an object concealed in and/or behind the workpiece which is locatable via the locating device. Preferably, the locatable object is designed as an alternating current line. In particular, an "alternating current line" is intended to mean an electrical line to which an AC voltage, in particular a grid voltage, is applied. The term "receive" is intended to mean in particular that the receiving means convert the wirelessly transmitted coupling signals into coupling signals transmitted by wire. In particular, an "amplifier circuit" is intended to mean a circuit which is provided to output a difference between a value, in particular of a current and/or advantageously of a voltage, of a first signal, and a value of a second signal, in an amplified manner. Preferably, the amplifier circuit outputs an output signal which is a function of the difference between the first signal and the second signal. Preferably, the locating device includes at least two amplifier circuits. Alternatively, the locating device could include at least three amplifier circuits, whose receiving means are advantageously spaced apart from each other in different directions. Preferably, the amplifier circuits are at least essentially, particularly preferably completely, provided to process the coupling signals in an analog manner. A "reference signal" is intended to mean in particular an electric potential which is at least essentially constant relative to a potential of the surroundings. Preferably, the reference signal and the potential of the surroundings are coupled capacitively in particular via the operator. In particular, the reference signal and the coupling signals are coupled at high resistance, i.e., in particular at a resistance greater than 100 kΩ, advantageously greater than 1 MΩ, particularly advantageously greater than 10 MΩ. In particular, a "difference" in this context is intended to mean a difference between a value of a first signal and a value of a second signal. The term "amplify" is intended to mean in particular that a value change of the output signal is greater than a value change of the difference of the two signals which are applied to inputs of the amplifier circuit. Via the design of the locating device according to the present disclosure, a dependence of locating on a coupling of the locating device with surroundings, in particular via an operator, may be advantageously reduced by way of a simple design, while achieving a particularly high sensitivity with low design complexity. In addition, an advantageous common-mode rejection of the coupling signal may be achieved.

In one additional embodiment, it is provided that during AC voltage locating, the amplifier circuits are provided to generate one output signal each, which is formed as a square-wave signal, whereby an evaluation may be achieved which is simple in design. An "output signal" is intended to mean in particular parameters which the amplifier circuits generate and which include at least one piece of information about the difference between the signals which are applied to each of the inputs of the amplifier circuits. Preferably, the amplifier circuits each have an analog output stage which generates the output signal. Alternatively or additionally, each of the amplifier circuits may include a circuit which is provided to generate a digital output signal by means of a threshold value. In particular, the term "generate" is intended to mean that an output signal is present at each output of the amplifier circuits. In particular, a "square-wave signal" is intended to mean a signal which alternates between two states. In particular, a square-wave signal differs from a digital signal in that in the case of a square-wave signal, a temporal length of a state is not predefined. Preferably, the states of the square-wave signal, in particular the currents and/or advantageously the voltages of the states, are functions of limits of the amplifier circuits. Preferably, the square-wave signal has a fundamental frequency which corresponds to the frequency of the grid voltage.

In addition, it is provided that the locating device includes an evaluation device which is provided to evaluate at least one phase position in particular of the output signal of the first amplifier circuit relative to the output signal of the second amplifier circuit, whereby a locating direction may be determined in a particularly simple manner. The phrase "evaluate the phase position" is intended in this context to mean that the evaluation device detects whether the output signals have an at least essentially identical phase or an at least essentially diametrically opposed phase. Preferably, the evaluation device also detects whether at least one of the output signals is static, i.e., has no change in value over a period of time, in an operating state. In particular, the evaluation device does not evaluate any piece of information about an amplitude of the output signals.

Furthermore, the evaluation device is provided to determine at least one locating direction from the phase position, whereby sensitive locating may be achieved by way of a simple design. A "locating direction" is intended to mean in particular a piece of information which describes the direction in which the locatable object is situated in particular relative to a reference point of the locating device.

In addition, it is provided that the evaluation device is provided to evaluate the output signals in a binary manner, whereby an analog-digital converter may be omitted. The term "evaluate in a binary manner" is intended to mean in particular that the evaluation device distinguishes between only two states of the output signals. Preferably, the evaluation device evaluates which of the two states the output signals are in and in particular when the states of the output signals change.

In addition, it is provided that the reference signal is designed as a device ground of the AC voltage locating apparatus, whereby an evaluation of the output signals of the amplifier circuits is possible which is simple in design. In particular, the reference signal is advantageously independent of a battery voltage of the locating device. In particular, a "device ground" is intended to mean an electrical connection which has an essentially constant potential relative to surroundings. Preferably, the AC voltage locating apparatus has a supply voltage having a potential which is different from the potential of the device ground during operation. Preferably, the locating device includes a battery which supports the difference between the potentials of the device ground and the supply voltage.

In one advantageous design of the present disclosure, it is provided that the amplifier circuits have an amplification factor of at least 50 dB, whereby a high sensitivity may be achieved and square-wave signals may be generated by way of a simple design. An "amplification factor" is intended to mean in particular a factor which describes a ratio between the difference of the signals at the inputs of one of the amplifier circuits and a difference of a signal at the output of this amplifier circuit and the reference signal.

In addition, it is provided that the amplifier circuits each include at least one operational amplifier, whereby a high amplification may be achieved by way of a simple design. An "operational amplifier" is intended to mean in particular an advantageously integrated amplifier which has an inverting and a non-inverting input and has an amplification factor greater than 30 dB. In particular, the amplifier circuits have no negative feedback of the operational amplifier. Preferably, the operational amplifiers of the amplifier circuits are configured as comparators. Alternatively or additionally, each of the amplifier circuits may include at least two operational amplifiers which are advantageously interconnected as instrument amplifiers.

Furthermore, it is provided that the AC voltage locating apparatus includes at least one filter means which is provided to filter at least one of the coupling signals, whereby in particular high-frequency disturbances may be advantageously suppressed. Preferably, the AC voltage locating apparatus includes at least two filter means, wherein each of the filter means filters one of the coupling signals during operation. A "filter means" is intended to mean in particular a means which is provided to reduce high-frequency disturbances. Preferably, the filter means has a 3-dB cutoff frequency less than 10 kHz, particularly preferably less than 1 kHz.

The locating device according to the present disclosure is not to be limited to the above-described application and specific embodiment. In particular, for fulfilling a functionality described herein, the locating device according to the present disclosure may have a number of individual elements, components, and units differing from a number aforementioned herein.

BRIEF DESCRIPTION OF THE DRAWINGS

Additional advantages result from the following description of the drawings. The drawings illustrate one exemplary embodiment of the present disclosure. The drawings, the description, and the claims contain many features in combination. Those skilled in the art will also advantageously consider the features individually and combine them into expedient additional combinations.

DETAILED DESCRIPTION

Figure 1:
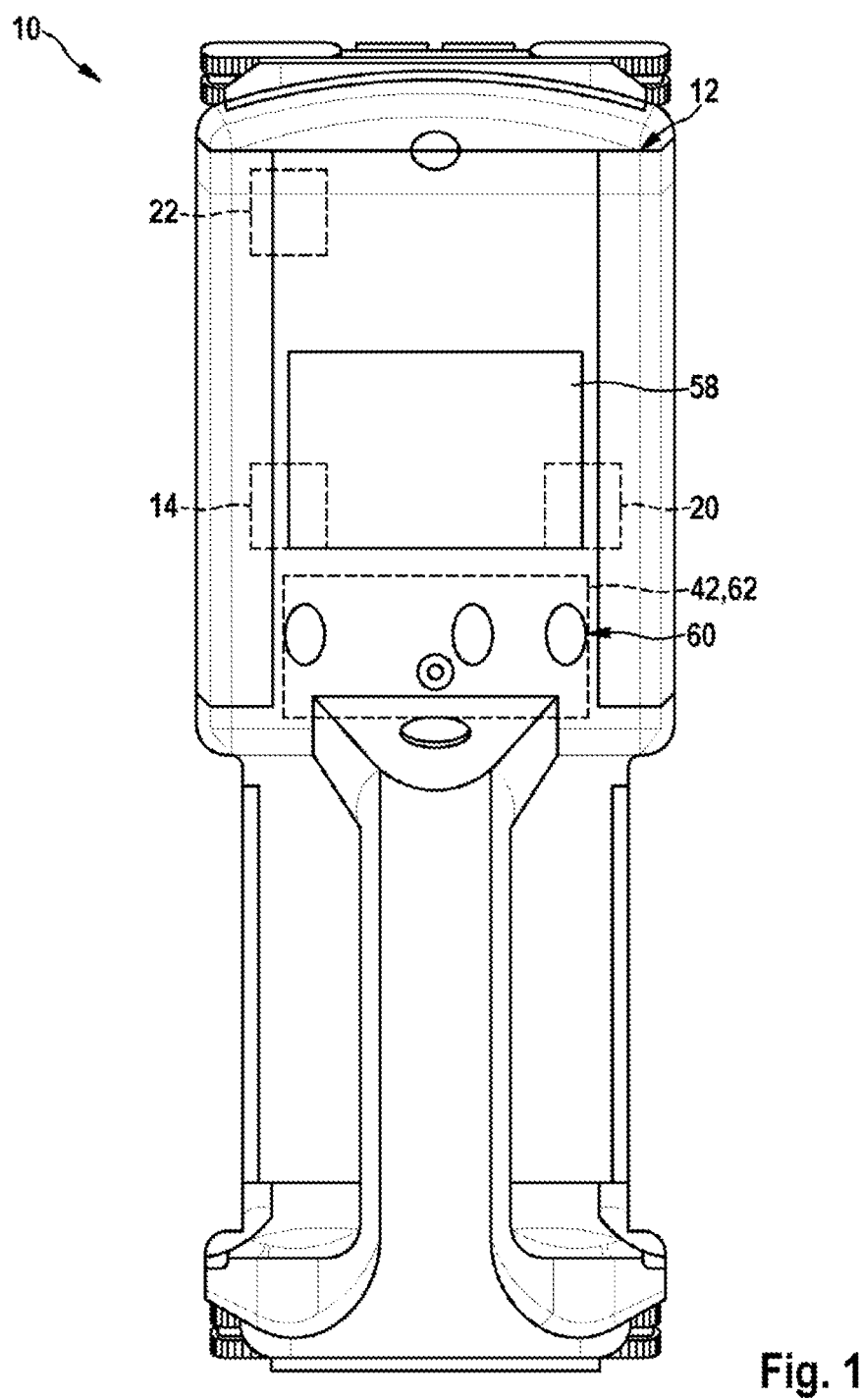
FIG. 1 shows a locating device according to the present disclosure including an AC voltage locating apparatus.

FIG. 1 shows a locating device 10 according to the present disclosure which is designed as a hand-held locating device for use at a construction site. The locating device 10 includes an AC voltage locating apparatus 12, a display 58 for depicting locating results, an operating device 60 for controlling locating by an operator, and a computation unit 62 for determining the locating results. FIG. 1 also shows a possible arrangement of three receiving means 14, 20, 22 of the AC voltage locating apparatus 12. Another arrangement of the at least three receiving means 14, 20, 22 appearing expedient to those skilled in the art is possible.

The AC voltage locating apparatus 12 includes the first receiving means 14, the second receiving means 20, the third receiving means 22, a first amplifier circuit 28, a second amplifier circuit 32, a third amplifier circuit 34, and an evaluation device 42. The receiving means 14, 20, 22 are designed as antennas which are provided each to receive a coupling signal 16, 24, 26 from a locatable object 18 concealed in a workpiece 64. The locatable object 18 is designed as an electrical line to which at least one grid voltage is applied at the point in time of the locating.

The coupling signals 16, 24, 26 are formed as AC voltages. The AC voltages have a frequency which corresponds to the grid voltage. An amplitude of the coupling signal 16, 24, 26 is a function of a distance of the receiving means 14, 20, 22 from the locatable object 18. The second receiving means 20 and the third receiving means 22 are spaced apart from the first receiving means 14 in two different directions. Here, the directions are oriented perpendicularly to each other.

The amplifier circuits 28, 32, 34 are designed as operational amplifiers. The operational amplifiers are in an open-loop configuration and thus have the function of a comparator. The amplifier circuits 28, 32, 34 each have an inverting input − and a non-inverting input +. The AC voltage locating apparatus 12 connects the first receiving means 14 electrically conductively to each of the inverting inputs − of the amplifier circuits 28, 32, 34. Alternatively, the signals connected to the inverting input − and the signals connected to the non-inverting input + could be exchanged.

The AC voltage locating apparatus 12 connects a reference signal 30 of the AC voltage locating apparatus 12 to the non-inverting input + of the first amplifier circuit 28. The reference signal 30 is designed as a device ground of the AC voltage locating apparatus 12. During locating, the first amplifier circuit 28 thus amplifies a difference of the first coupling signal 16 relative to the reference signal 30.

The AC voltage locating apparatus 12 connects the second receiving means 20 to the non-inverting input + of the second amplifier circuit 32. During locating, the second amplifier circuit 32 thus amplifies a difference of the first coupling signal 16 relative to the second coupling signal 24. The coupling signal 16, 24 which originates from the one of the two receiving means 14, 20 which is situated closer to the locatable object 18, has a larger value, here, a higher voltage amplitude.

The AC voltage locating apparatus 12 connects the third receiving means 22 to the non-inverting input + of the third amplifier circuit 34. During locating, the third amplifier circuit 34 thus amplifies a difference of the first coupling signal 16 relative to the third coupling signal 26. The coupling signal 16, 26 which originates from the one of the two receiving means 14, 22 situated closer to the locatable object 18, has a larger value, here, a higher voltage amplitude.

Figure 3:
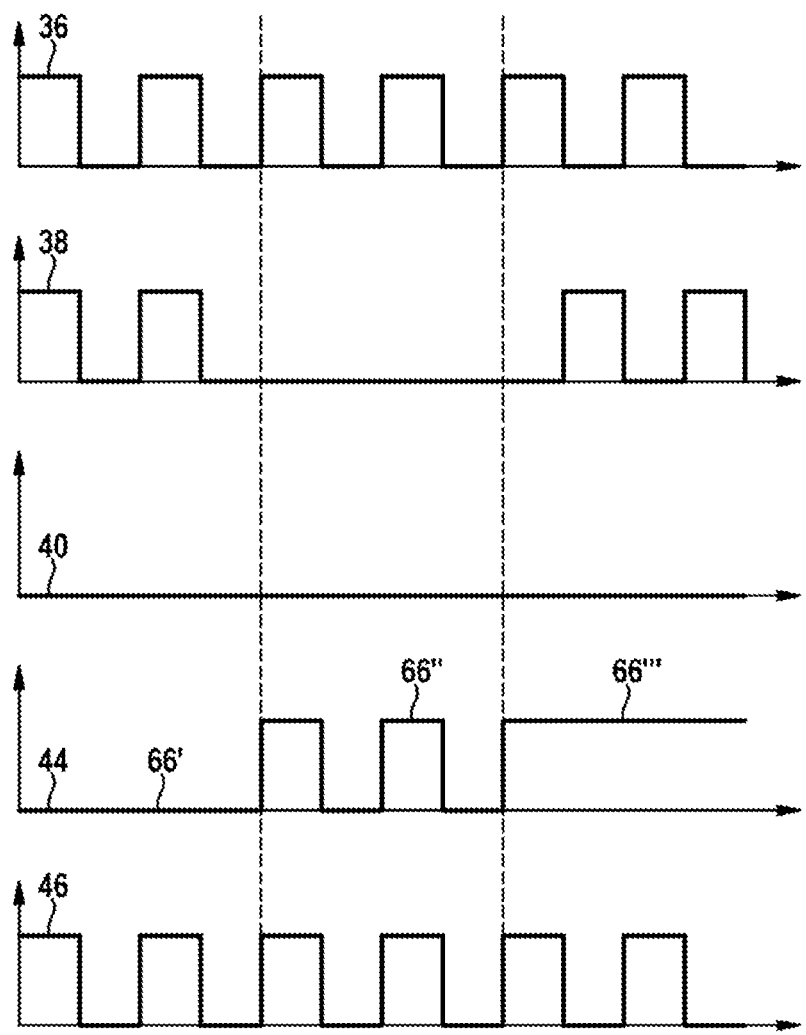
FIG. 3 shows a signal profile of output signals of the AC voltage locating apparatus of the locating apparatus from FIG. 1.

The operational amplifiers of the amplifier circuits 28, 32, 34 to which the coupling signals 16, 24, 26 are applied have an amplification factor of 90 dB. The operational amplifiers of the amplifier circuits 28, 32, 34 have no negative feedback. Due to the high amplification of the amplifier circuits 28, 32, 34, the first coupling signals 16, 24, 26 are amplified to such an extent that output signals 36, 38, 40 of the amplifier circuit 28 reach a voltage limit of the amplifier circuit 28. As FIG. 3 shows, the output signals 36, 38, 40 are formed as square-wave signals.

The evaluation device 42 is designed as one piece with the computation unit 62. The evaluation device 42 is provided to evaluate phases of the output signals 38, 40 of the second and the third amplifier circuit 32, 34 relative to the output signal 36 of the first amplifier circuit 28. From the phases, the evaluation device 42 determines the first phase position 44 depicted in FIG. 3, which describes a phase of the first output signal 36 relative to the second output signal 38, and the second phase position 46, which describes a phase of the first output signal 36 relative to the third output signal 40. The evaluation device 42 is provided to evaluate the output signals 36, 38, 40 of the amplifier circuits 28, 32, 34 in a binary manner.

The phase positions 44, 46 may at least theoretically assume three states 66 each, which are explained here based on the first phase position 44. In the case of a first of the three states 66' of the phase positions 44, the first output signal 36 and the second output signal 38 have an identical value profile. The phase position 44 is thus constant at a low level, here, essentially the device ground. This is the case if the locatable object 18' is situated closer to the first receiving means 14 than to the second receiving means 20.

In the case of a second of the three states 66" of the phase position 44, the first output signal 36 has a square wave-shaped value profile, and the second output signal 38 has a constant value profile. This is the case if the locatable object 18" is centered with respect to the first receiving means 14 and the second receiving means 20. In order for this state 66" to enter into actual operation, the second amplifier circuit 32 could, in addition to the operational amplifier to which the coupling signals 16, 24 are applied, include a downstream filter, in particular a low-pass filter, whose output signal is applied to a comparator having a hysteresis, for example, a Schmitt trigger. The filter behavior of the filter and the hysteresis of the comparator thus determine the value range in which the locatable object 18" is detected as centered. The filter and the comparator may be configured in an analog manner or alternatively converted by means of digital signal processing. Alternatively, this second state 66" could be detected in another manner appearing expedient to those skilled in the art.

In a third of the three states 66''' of the phase position 44, the first output signal 36 and the second output signal 38 have a diametrically opposed value profile. The phase position 44 is thus constant at a high value, here, essentially a supply voltage of the AC voltage locating apparatus 12. This is the case if the locatable object 18''' is situated closer to the second receiving means 20 than to the first receiving means 14.

The AC voltage locating apparatus 12 has three filter means 52, 54, 56 which are provided to filter one of the coupling signals 16, 24, 26 in each case. The filter means 52, 54, 56 are each a portion of a low-pass filter. Here, filter means 52, 54, 56 are designed as impedances. Alternatively, the filter means 52, 54, 56 could be designed as high-resistance resistors. Input capacitors of the amplifier circuits 28, 32, 34 form an additional portion of the low-pass filter. The low-pass filters may alternatively have a different design appearing expedient to those skilled in the art.

Figure 2:
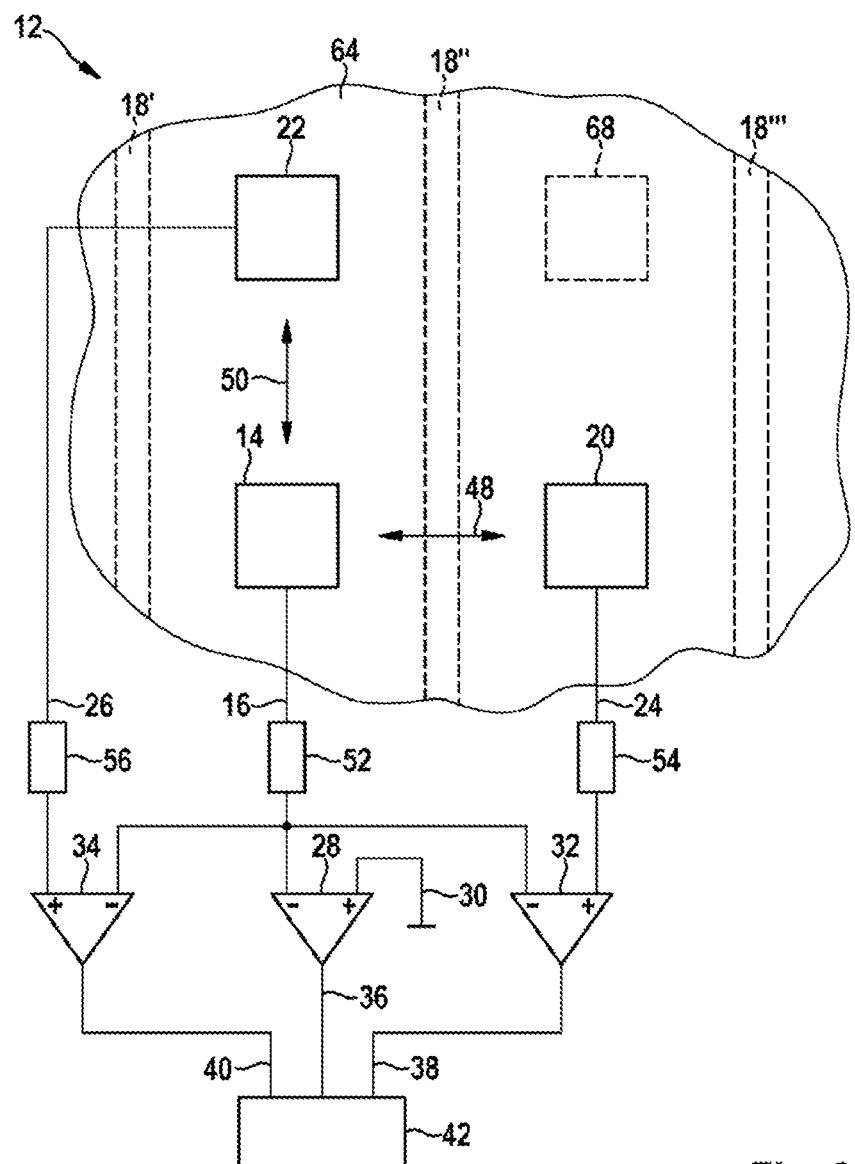
FIG. 2 shows a schematic view of the AC voltage locating apparatus of the locating device from FIG. 1 and a workpiece including a locatable object.

FIG. 2 shows a possible arrangement of another, fourth receiving means 68. The four receiving means 14, 20, 22, are arranged in such a way that the four receiving means 14, 20, 22, 68 are arranged on corners of a rectangle, here, a square. Three additional amplifier circuits, which are provided to amplify the differences of the coupling signals 24, 26 of the second receiving means 20, the third receiving means 22, and the fourth receiving means 68, are not shown in greater detail. A coupling signal of the fourth receiving means 68 is connected to one of the inverting inputs − of the three additional amplifier circuits. The other inputs are connected in such a way as described for the first three amplifier circuit 28, 32, 34. Via the additional receiving means 68 and the additional amplifier circuits, the evaluation device 42 is able to detect whether the locatable object 18 is oriented parallel to a side of the rectangular arrangement.

The invention claimed is:
1. A locating device, comprising:
an AC voltage locating apparatus including:
a first receiving apparatus configured to receive a first coupling signal from a locatable object;
a second receiving apparatus configured to receive at least a second coupling signal from the locatable object;

a first amplifier circuit having a first input operably connected to receive the first coupling signal from the first receiving apparatus and a second input operably connected to receive a reference signal, the first amplifier circuit being configured to amplify a difference between the first coupling signal and the reference signal in at least one operating state; and a second amplifier circuit having a first input operably connected to receive the first coupling signal from the first receiving apparatus and a second input operably connected to receive the second coupling signal from the second receiving apparatus, the second amplifier circuit being configured to amplify a difference between the first coupling signal and the second coupling signal in at least one operating state.

2. The locating device as claimed in claim 1, wherein during AC voltage locating, the first amplifier circuit and the second amplifier circuit are each configured to generate an output signal formed as a square-wave signal.

3. The locating device as claimed in claim 1, wherein the AC voltage locating apparatus further includes:
an evaluation device configured to (i) receive an first output signal from the first amplifier circuit and a second output signal from the second amplifier circuit, and (ii) evaluate at least one phase position of at least one of the first output signal and the second output signal.

4. The locating device as claimed in claim 3, wherein the evaluation device is further configured to determine at least one locating direction based on the at least one phase position.

5. The locating device at least as claimed in claim 2, wherein an evaluation device is configured to evaluate the first output signal and the second output signal in a binary manner.

6. The locating device as claimed in claim 1, wherein the reference signal is a device ground of the AC voltage locating apparatus.

7. The locating device as claimed in claim 1, wherein the amplifier circuit and the second amplifier circuit each have an amplification factor of at least 50 dB.

8. The locating device as claimed in claim 1, wherein the first amplifier circuit and the second amplifier circuit each include at least one operational amplifier.

9. The locating device as claimed in claim 1, wherein the AC voltage locating apparatus further includes:
at least one filter apparatus configured to filter at least one of the first coupling signal and second coupling signal.

10. An AC voltage locating apparatus of a locating device, comprising:
a first receiving apparatus configured to receive a first coupling signal from a locatable object;
a second receiving apparatus configured to receive at least a second coupling signal from the locatable object;
a first amplifier circuit having a first input operably connected to receive the first coupling signal from the first receiving apparatus and a second input operably connected to receive a reference signal, the first amplifier circuit being configured to amplify a difference between the first coupling signal and the reference signal in at least one operating state; and
a second amplifier circuit having a first input operably connected to receive the first coupling signal from the first receiving apparatus and a second input operably connected to receive the second coupling signal from the second receiving apparatus, the second amplifier circuit being configured to amplify a difference between the first coupling signal and the second coupling signal in at least one operating state.

* * * * *